(12) United States Patent
Ueno et al.

(10) Patent No.: US 12,194,715 B2
(45) Date of Patent: *Jan. 14, 2025

(54) POLYPROPYLENE MULTILAYER SHEET

(71) Applicants: FP CORPORATION, Hiroshima (JP); SunAllomer Ltd., Tokyo (JP)

(72) Inventors: Shingo Ueno, Hiroshima (JP); Takeshi Nakajima, Kanagawa (JP); Masayuki Ikeda, Kanagawa (JP)

(73) Assignees: FP Corporation, Hiroshima (JP); SunAllomer Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/036,371

(22) PCT Filed: Nov. 11, 2021

(86) PCT No.: PCT/JP2021/041523
§ 371 (c)(1),
(2) Date: May 10, 2023

(87) PCT Pub. No.: WO2022/102705
PCT Pub. Date: May 19, 2022

(65) Prior Publication Data
US 2024/0009975 A1    Jan. 11, 2024

(30) Foreign Application Priority Data

Nov. 13, 2020 (JP) ................. 2020-189249

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2250/242* (2013.01);
(Continued)

(58) Field of Classification Search
None
See application file for complete search history.

(56) References Cited

U.S. PATENT DOCUMENTS

2013/0196168 A1    8/2013  Hikosaka et al.
2021/0387396 A1*  12/2021  Nakajima ............... B29C 48/08

FOREIGN PATENT DOCUMENTS

CN    104761813 A    7/2015
CN    110121528 A    8/2019
(Continued)

OTHER PUBLICATIONS

International Search Report for International Application No. PCT/JP2021/041523, mailed Jan. 25, 2022, 2 pages.
(Continued)

*Primary Examiner* — Samir Shah
(74) *Attorney, Agent, or Firm* — Workman Nydegger

(57) ABSTRACT

A polypropylene multilayer sheet comprising: a first biaxially oriented polypropylene layer having a melting point Tmh; and a second biaxially oriented polypropylene layer having a melting point Tml, the first biaxially oriented polypropylene layer and the second biaxially oriented polypropylene layer being alternately laminated, the polypropylene multilayer sheet having a thickness of 0.20 to 3.0 mm, wherein Tmh>Tml, and a total number of layers is 3 to 11.

13 Claims, 3 Drawing Sheets

(A)            (B)

(52) U.S. Cl.
CPC ..... *B32B 2250/42* (2013.01); *B32B 2307/306* (2013.01); *B32B 2307/412* (2013.01); *B32B 2307/518* (2013.01); *B32B 2307/7376* (2023.05); *B32B 2323/10* (2013.01); *B32B 2439/00* (2013.01)

(56) References Cited

FOREIGN PATENT DOCUMENTS

| | | | |
|---|---|---|---|
| JP | H03-239525 A | 10/1991 | |
| JP | 05-262897 A | 10/1993 | |
| JP | 10-291284 A | 11/1998 | |
| JP | 2000233465 A | 8/2000 | |
| JP | 2012096526 | 5/2012 | |
| JP | 2012-158107 A | 8/2012 | |
| JP | 2013-103369 A | 5/2013 | |
| JP | 2017186561 | 10/2017 | |
| JP | 2019155703 | 9/2019 | |
| JP | WO 2020075755 * | 4/2020 | |
| JP | 2018095698 | 3/2021 | |
| JP | 2021-091116 A | 6/2021 | |
| WO | 2018/124177 A1 | 7/2018 | |
| WO | WO-2020075755 A1 * | 4/2020 | ......... B29C 48/0018 |

OTHER PUBLICATIONS

European Extended Search Report and Opinion for European Application No. 21891950.4, dated Jul. 24, 2024, 7 pages.

Canadian Requisition by the Examiner for Canadian Application No. 3,198,293, dated Dec. 4, 2023, 5 pages.

Chinese First Office Action for Chinese Application No. 202180075295.7, dated Jan. 13, 2024, 9 pages with translation.

European Search Report received for EP Patent Application No. 21891950.4, mailed on Jul. 24, 2024, 7 pages.

International Preliminary Report on Patentability received for PCT Patent Application No. PCT/JP2021/041523, mailed on May 25, 2023, 14 pages (6 pages of English Translation and 8 pages of Original Document).

International Preliminary Report on Patentability received for PCT Patent Application No. PCT/JP2021/041525, mailed on May 25, 2023, 15 pages (6 pages of English Translation and 9 pages of Original Document).

International Search Report for International Application No. PCT/JP2021/041525, mailed Jan. 25, 2022, 2 pages.

European Extended Search Report and Opinion for European Application No. 21891951.2, dated Aug. 5, 2024, 8 pages.

* cited by examiner (A)

(B)

POLYPROPYLENE MULTILAYER SHEET

TECHNICAL FIELD

The present invention relates to a polypropylene multilayer sheet.

BACKGROUND ART

Oriented polypropylene films are used in the fields that require excellent transparency and mechanical properties as well as high heat resistance, and various techniques for further improving these properties have been studied. For example, PTL 1 discloses that a sheet extremely excellent in balance among rigidity, transparency, heat resistance, uniform stretchability, low-temperature impact properties, and easiness of thermoformability is obtained from a polypropylene composition having a molecular weight distribution and the like in a specific range and a content of a comonomer and a crystal nucleating agent in a specific range. In addition, PTL 2 discloses a sheet made of a polymer nano-oriented crystal material containing, as a main component, polymer nano-oriented crystals which have a crystal size on the order of nanometers and highly oriented polymer chains, and which are obtained by cooling and crystallizing a polymer melt while being maintained in an oriented melt state.

Since these sheets are thin, the application of these sheets is limited, and when the thickness of the sheets can be increased, expansion of their use to another application can be expected. In this regard, PTL 3 discloses that a multilayer sheet having excellent transparency and mechanical properties in addition to high heat resistance, and having a thickness of 0.5 to 5 mm is produced by alternately laminating biaxially oriented polypropylene films having different melting points.

CITATION LIST

Patent Literature

PTL 1: JP 2018-095698 A
PTL 2: JP 2012-096526 A
PTL 3: International Publication No. WO 2020/075755

SUMMARY OF INVENTION

Technical Problem

PTL 3 does not disclose details regarding forming the multilayer sheet into a formed article. The inventors have found that, in the technique of PTL 3, further improvement is required to form a relatively thick polypropylene multilayer sheet into a product such as a container. In view of the above circumstances, an object of the present invention is to provide a polypropylene multilayer sheet having excellent transparency and mechanical properties as well as excellent formability.

Solution to Problem

The present inventors have found that a polypropylene multilayer sheet, in which a specific number of two types of biaxially oriented polypropylene layers having different melting points are alternately laminated, solves the above problems, and have completed the present invention. That is, the above-described problems can be solved by the present invention below.

(1) A polypropylene multilayer sheet comprising:
a first biaxially oriented polypropylene layer having a melting point Tmh; and
a second biaxially oriented polypropylene layer having a melting point Tml,
the first biaxially oriented polypropylene layer and the second biaxially oriented polypropylene layer being alternately laminated,
the polypropylene multilayer sheet having a thickness of 0.20 to 3.0 mm, wherein Tmh>Tml, and a total number of layers is 3 to 11.
(2) The polypropylene multilayer sheet according to (1), in which
the polypropylene multilayer sheet includes a coextruded layer in which the first biaxially oriented polypropylene layer and the second biaxially oriented polypropylene layer are coextruded as alternately laminated, and
the coextruded layer has a thickness of 0.10 to 0.50 mm, and a total number of the coextruded layers is 2 to 6.
(3) The polypropylene multilayer sheet according to (1) or (2), in which a ratio Dh/Dl of a total thickness Dh of the first biaxially oriented polypropylene layer to a total thickness Dl of the second biaxially oriented polypropylene layer is 1 to 30.
(4) The polypropylene multilayer sheet according to any one of (1) to (3), in which the first biaxially oriented polypropylene layer is formed of:
a propylene homopolymer;
a propylene random copolymer containing 1 wt % or less of at least one comonomer selected from C2 to C10 α-olefins (excluding C3 α-olefins); or
a resin composition containing the propylene homopolymer or the propylene random copolymer.
(5) The polypropylene multilayer sheet according to any one of (1) to (4), in which a polymer or a resin composition constituting the first biaxially oriented polypropylene layer has a melt flow rate (MFR) (230° C., load 2.16 kg) of 1 to 15 g/10 min.
(6) The polypropylene multilayer sheet according to any one of (1) to (5), in which the second biaxially oriented polypropylene layer is formed of:
a propylene homopolymer;
a propylene random copolymer containing 5 wt % or less of at least one comonomer selected from C2 to C10 α-olefins (excluding C3 α-olefins); or
a resin composition containing the propylene homopolymer or the propylene random copolymer.
(7) The polypropylene multilayer sheet according to any one of (1) to (6), in which the first biaxially oriented polypropylene layer is formed of a resin composition containing a nucleating agent.
(8) The polypropylene multilayer sheet according to any one of (1) to (7), in which in the multilayer polypropylene sheet, in an integrated intensity $Ix^V$ at an azimuth angle determined from a small angle X-ray scattering two-dimensional profile as measured by allowing an X-ray (wavelength: 0.154 nm) to be incident in the X direction, a scattering peak is observed in a range of $2\theta=0.2°$ to $1.0°$.
(9) A method for producing the polypropylene multilayer sheet according to any one of (1) to (8), the method comprising:
a step 1 of preparing a precursor in which
a first biaxially oriented polypropylene layer having a melting point Tmh, and a second biaxially oriented polypropylene layer having a melting point Tml are laminated such that the first biaxially oriented polypropylene layers are not adjacent to each other; and a step 2 of bringing a heating element into contact with an outermost layer of the precursor to thermally fusion bond interlayers of the multilayer sheet, in which Tmh>Tml.

(10) The production method according to (9), in which a melting point $Tm_{out}$ of the outermost layer and a temperature T of the heating element satisfy the following condition:

$Tm_{out}-T \geq 4(° C.)$ where the melting point is measured by a differential scanning calorimeter (DSC) under condition of a heating rate of 10° C./min from 30° C. to 230° C.

(11) The production method according to (9) or (10), in which the step 1 includes a step of coextruding a raw material of the first biaxially oriented polypropylene layer and a raw material of the second biaxially oriented polypropylene layer to prepare a coextruded original sheet having a plurality of layers, and preparing the precursor using a product obtained by biaxially stretching the coextruded original sheet.

(12) A formed article obtained by forming the polypropylene multilayer sheet according to any one of (1) to (8).

(13) The formed article according to (12), which is a container.

(14) A precursor of the polypropylene multilayer sheet according to any one of (1) to (8), in which a first biaxially oriented polypropylene layer having a melting point Tmh, and a second biaxially oriented polypropylene layer having a melting point Tml are laminated such that the first biaxially oriented polypropylene layers are not adjacent to each other, and the precursor has one or more interfaces that are not fusion bonded.

(15) A polypropylene multilayer sheet produced by the method according to any one of (9) to (11).

Advantageous Effects of Invention

According to the present invention, a polypropylene multilayer sheet having excellent transparency and mechanical properties as well as excellent formability can be provided.

DESCRIPTION OF EMBODIMENTS

Hereinafter, the present invention will be described in detail. In the present invention, "X to Y" includes its end values, that is, X and Y. In the present invention, a sheet and a film are used synonymously, and in particular, a film-like part having a thickness of 150 μm or more may be referred to as a sheet, and a film-like part having a thickness of less than 150 μm may be referred to as a film. In addition, the sheet and the film may be collectively referred to as "sheet-like part".

1. Polypropylene Multilayer Sheet (1) Thickness

The thickness of the polypropylene multilayer sheet of the present invention (hereinafter, also simply referred to as "multilayer sheet") is 0.20 to 3.0 mm, preferably 0.20 to 1.5 mm, and more preferably 0.20 to 1.0 mm. The thickness of the multilayer sheet is appropriately adjusted depending on the application.

(2) Multilayer Structure

The multilayer sheet of the present invention has a multilayer structure in which a first layer having a high melting point Tmh and a second layer having a low melting point Tml are alternately laminated. Since between the respective layers are fusion bonded, the multilayer sheet of the present invention is an integrated sheet. Whether between the respective layers of the sheet are fusion bonded and integrated can be confirmed by cross-sectional observation with a polarization optical microscope, as described in PTL 3.

Figure 1:
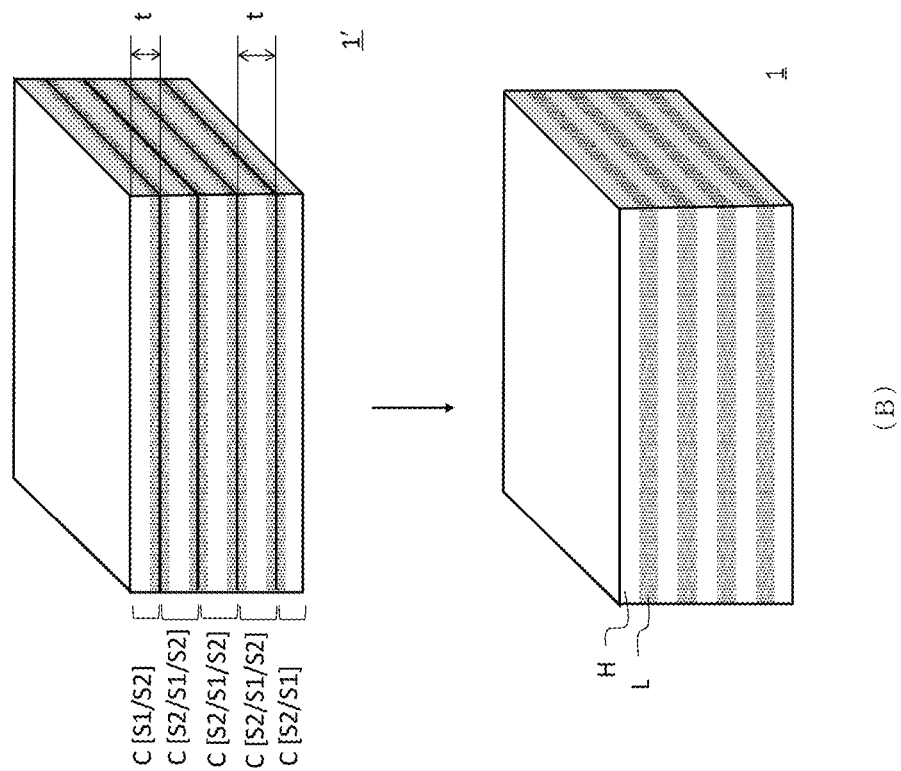
FIG. 1 illustrates a view for describing an outline of a polypropylene multilayer sheet of the present invention.
Figure 1:
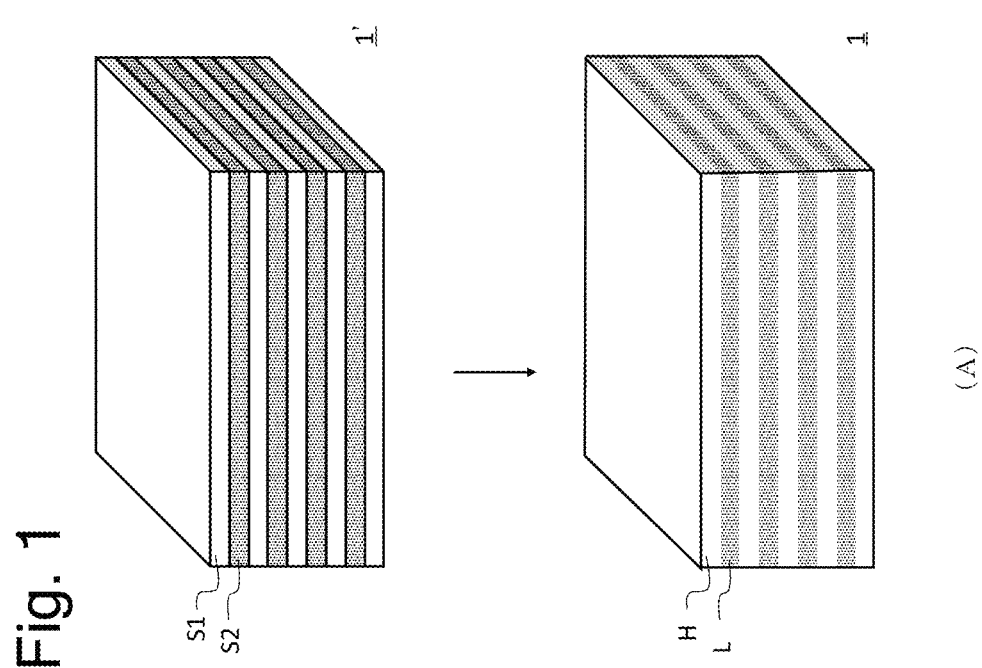

As described later, the respective layers in the multilayer sheet of the present invention are derived from a polypropylene biaxially oriented sheet-like part. Each layer may be independently composed of the sheet-like part. This aspect is illustrated in FIG. 1A. In the drawing, the reference alphanumeric H denotes the first layer, the reference alphanumeric L denotes the second layer, the reference alphanumeric 1' denotes a precursor to be described later, and the reference alphanumeric s S1 and S2 denote polypropylene biaxially oriented sheet-like parts constituting the precursor 1'. The interlayers of the precursor 1' are fusion bonded to form a multilayer sheet 1 of the present invention.

At least a part of all the layers may be composed of coextruded layers which are obtained by coextrusion, and in which the first biaxially oriented polypropylene layer and the second biaxially oriented polypropylene layer are alternately laminated. This aspect is illustrated in FIG. 1B. In the drawing, the reference alphanumeric C denotes a coextruded layer, and for example, C[S1/S2] denotes a two-layer coextruded layer. Other reference alphanumeric s are as described in FIG. 1A. In the aspect of FIG. 1B, the multilayer sheet 1 of the present invention is formed from the precursor 1' having three three-layer coextruded layers C[S2/S1/S2] between two coextruded layers C[S1/S2] and C[S2/S1].

The total number of layers in the multilayer sheet of the present invention is 3 to 11. When the total number of layers is within this range, the multilayer sheet of the present invention exhibits excellent formability, that is, has excellent formability when formed into an article. In an aspect including coextruded layers, the thickness of the coextruded layer is preferably 0.10 to 0.50 mm. The total number of coextruded layers is preferably 2 to 6, more preferably 2 to 5, even more preferably 2 to 4, and particularly preferably 2 to 3. The thickness of the coextruded layer refers to the thickness of the entire coextruded layer C (denoted by t in FIG. 1B). In the case of FIG. 1B, the total number of coextruded layers is 5.

When the value of the ratio Dh/Dl of the total thickness (sum of the thicknesses), Dh of the first layer to Dl of the second layer, is excessively small, the rigidity of the multilayer sheet is insufficient, and when the value is excessively large, the fusion bonding properties between layers of the multilayer sheet are insufficient. For the balance of fusion bonding properties and rigidity, the ratio Dh/Dl is preferably 1 to 30, more preferably 1 to 25, and even more preferably 4 to 15. The thickness of each layer may be the same or different. The thickness of each layer is appropriately adjusted so that the ratio Dh/Dl falls within the above range. The thickness of the first layer is preferably 50 μm to 200 μm. The thickness of the second layer is preferably 5 μm to 200 μm.

The melting point Tmh of the first layer and the melting point Tml of the second layer satisfy the relationship Tmh>Tml. The value of Tmh−Tml is not limited, but is preferably 1° C. or higher, more preferably 10° C. or higher, and even more preferably 25° C. or higher. The value Tmh−Tml is preferably 60° C. or lower. When these melting points are excessively low, the rigidity and heat resistance of the multilayer sheet are insufficient. From this viewpoint, the melting point Tmh is preferably 160° C. or higher, more preferably 165° C. or higher, and the melting point Tml is preferably 100° C. or higher, more preferably 120° C. or higher, and even more preferably 130° C. or higher. These melting points can be measured by DSC under the condition of a heating rate of 10° C./min from 30° C. to 230° C.

Figure 2:
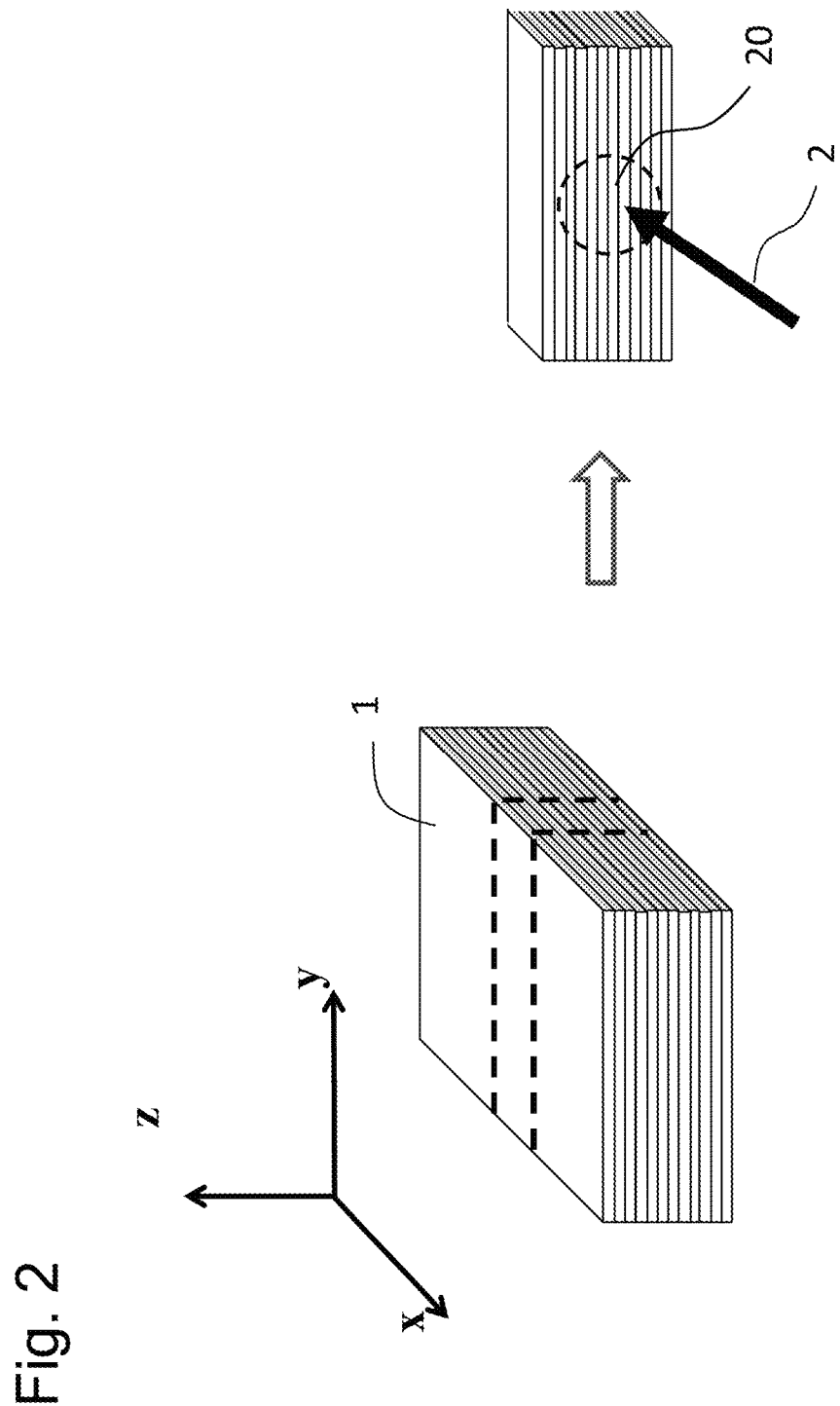
FIG. 2 illustrates a view for describing the measurement method of integrated intensities $Ix^V$ and $Ix^L$ in an azimuth angle.
Figure 3:
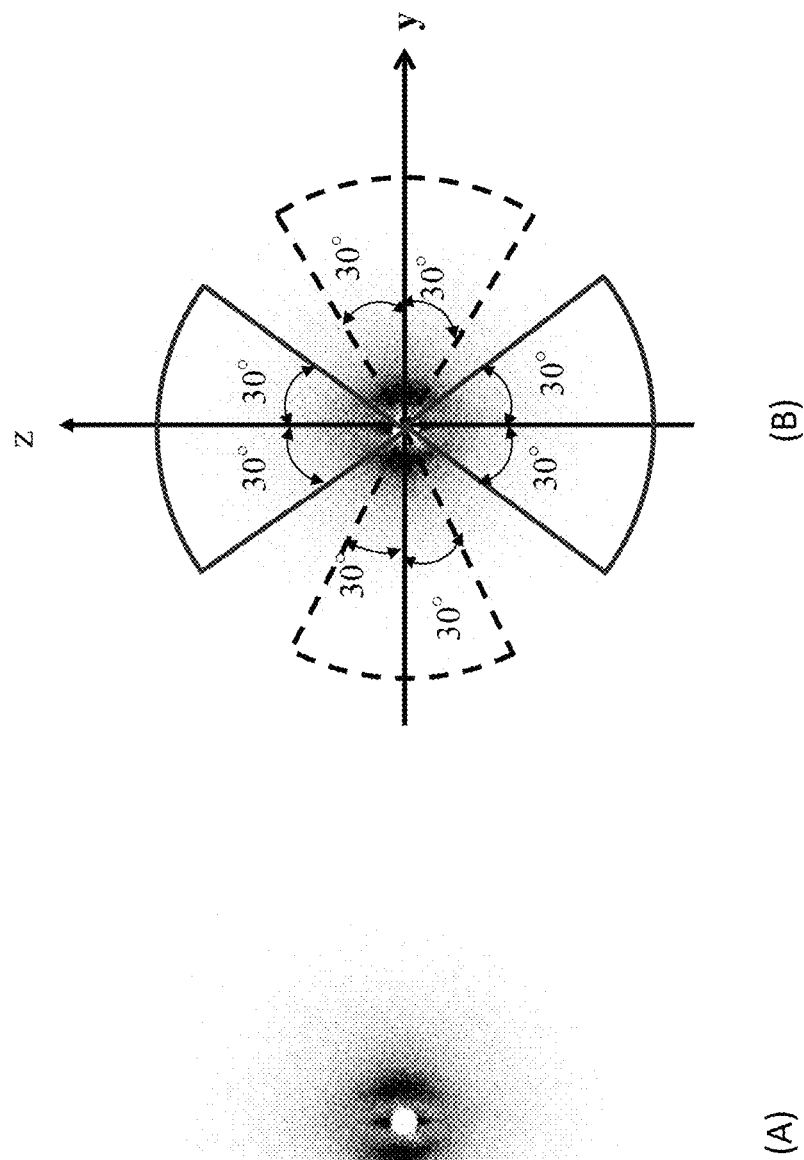
FIG. 3 illustrates a view for describing the analysis method of integrated intensities $Ix^V$ and $Ix^L$ in an azimuth angle.

In the multilayer sheet of the present invention, in the integrated intensity Ix v in an azimuth angle of scattering of the meridian (Z) direction in a small angle X-ray two-dimensional profile as measured by allowing an X-ray (wavelength: 0.154 nm) to be incident from the X direction, the scattering peak is preferably observed in a range of 2θ=0.2° to 1.0°. Specifically, as illustrated in FIG. 2, a sample for integrated intensity measurement is cut out from the multilayer sheet of the present invention, and an X-ray is incident to the sample from the X direction. As a result, the two-dimensional profile of small angle X-ray scattering as illustrated in FIG. 3A can be obtained. Then, as illustrated in FIG. 3B, the integrated intensity $Ix^V$ is determined by integrating the intensities in the region ±30° with respect to the meridian, and the integrated intensity $Ix^L$ is determined by integrating the intensities in the region ±30° with respect to the equator.

The scattering peak of the equatorial direction is originated from crystal lamellae regularly arranged in the in-plane direction of the sheet. When the regularly arranged crystal lamellae s exist, the scattering intensity in the equatorial direction increases. Meanwhile, the streak of the meridian direction is mainly originated from the reflection at the surface of gaps remaining between the layers in the Z direction. Thus, when the oriented crystallites of the biaxially oriented sheet-like part are maintained or increased in the multilayer sheet, $Ix^L$ becomes large. Meanwhile, when fusion bonding between layers is sufficient, the surface of gaps remaining between the layers decreases, resulting in decrease in the streak of $Ix^V$. Therefore, when $Ix^L$ is large and $Ix^V$ is small, the transparency and mechanical properties of the multilayer sheet and the formed article such as a container obtained from the sheet are improved. In the α-crystal of polypropylene, when crystallization proceeds in a state in which crystal lamellae (parent lamellae) exist, lamellae with a small size (daughter lamellae) are grown in a direction substantially vertical to the parent lamellae. The scattering peak for long period originated from the daughter lamellae is observed as $Ix^V$.

(3) Mechanical Properties and Heat Resistance

The multilayer sheet of the present invention, and a formed article such as a container obtained from the multilayer sheet of the present invention have excellent mechanical properties. For example, the sheet and the formed article preferably have a tensile modulus (JIS K7161-2) of 1,500 MPa or more, and more preferably 2,000 MPa or more, as rigidity. The multilayer sheet of the present invention is also excellent in cold impact resistance. For example, the multilayer sheet and the formed article of the present invention preferably have an in-plane impact strength (−30° C., JIS K7211-2) of 3.0 J or more, more preferably 4.0 J or more, and even more preferably 5.0 J or more.

The container obtained from the multilayer sheet of the present invention is excellent in heat resistance, and thus can be used at a wide range of temperatures. In particular, the heat-resistant temperature in the buckling test of the container is preferably 100° C. or higher, more preferably 120° C. or higher, and even more preferably 130° C. or higher. A container having a heat-resistant temperature in this range in the buckling test has excellent applicability to a microwave oven. The buckling test is performed in the following steps.

1) A container is placed on a plate made of metal or the like having high heat resistance so that the opening of the container faces downward, and then the container is maintained for 1 hour while being heated in an oven in state in which no load is applied.
2) After opening the oven door, a load (640 g) is immediately placed on the container, and the load is removed after 10 seconds.
3) The plate and the container are taken out from the oven, and the presence or absence of buckling of the container is visually checked.
4) The temperature at which the container starts to buckle is defined as a heat-resistant temperature.

(4) Transparency

The multilayer sheet of the present invention, and a formed article such as a container obtained from the multilayer sheet of the present invention have excellent transparency. For example, the sheet preferably has a total haze (ISO 14782) of 20% or less, more preferably 10% or less, and even more preferably 8.0% or less. A smaller value of the total haze indicates better transparency.

(5) Surface

A functional group can be applied to the surface of the multilayer sheet of the present invention. As the functional group, an oxygen-containing functional group is preferred. Examples of the oxygen-containing functional group include a carboxyl group, a carboxylate group, an acid anhydride group, a hydroxy group, an aldehyde group, and an epoxy group. These functional groups enhance adhesion between the multilayer sheet of the present invention and other materials.

(6) Respective Layers

1) First Layer

In the present invention, polypropylene refers to a polymer or resin composition containing polypropylene as a main component. The first layer is formed of: a propylene homopolymer (HOMO); a propylene random copolymer (RACO) containing 1 wt % or less of at least one comonomer selected from C2 to C10 α-olefins (excluding C3 α-olefins); or a resin composition containing a HOMO or a RACO. In the present invention, the comonomers selected from C2 to C10 α-olefins naturally contain no C3 α-olefins. The first layer is particularly preferably formed of a HOMO or a RACO with a small comonomer content for excellent rigidity and transparency. The comonomer content is preferably more than 0 wt % and 0.5 wt % or less. The comonomer is preferably ethylene (C2 α-olefin).

The HOMO and the RACO are produced by a known polymerization method. At that time, a known polymerization catalyst can be used. However, in consideration of the balance between rigidity and transparency, the HOMO and the RACO are preferably polymerized using a polymerization catalyst containing a succinate-based compound as an internal electron-donating compound (hereinafter, sometimes abbreviated as "Suc").

The MFR (230° C., load 2.16 kg) of the polymer or resin composition constituting the first layer is preferably 1 to 15 g/10 min, more preferably 2 to 10 g/10 min, and even more preferably 3 to 8 g/10 min. When the MFR is excessively small or excessively large, it is difficult to biaxially stretch the original sheet, so that the mechanical properties of the multilayer sheet may be deteriorated.

The first layer may be formed of a resin composition containing a nucleating agent. The nucleating agent refers to an additive (clarifying agent) used for controlling the size of crystalline components in resin to small to thereby enhance transparency. Inclusion of the nucleating agent improves the transparency of the first layer. From the economic viewpoint, the amount of the nucleating agent is preferably 0.5 parts by weight or less, more preferably 0.2 parts by weight or less, and even more preferably 0.1 parts by weight or less, based on 100 parts by weight of the polymer that forms the first layer. The nucleating agent is not particularly limited, and one typically used in this field can be used. The nucleating agent is preferably selected from the group consisting of nonitol-based nucleating agents, sorbitol-based nucleating agents, phosphate ester-based nucleating agents, triaminobenzene derivative nucleating agents, metal carboxylate nucleating agents, and xylitol-based nucleating agents. The nucleating agent is more preferably a nonitol-based nucleating agent. Examples of the nonitol-based nucleating agent include 1,2,3-trideoxy-4,6,5,7-bis-[(4-propylphenyl)methylene]-nonitol. Examples of the sorbitol-based nucleating agent include 1,3,2,4-bis-o-(3,4-dimethylbenzylidene)-D-sorbitol. Examples of the phosphate ester-based nucleating agent include lithium 2,2'-methylenebis(4,6-di-tert-butylphenyl)phosphate-based nucleating agents. Therefore, the first layer can be formed of a resin composition containing a HOMO and a nucleating agent, or a resin composition containing a RACO and a nucleating agent.

2) Second Layer

The second layer is preferably formed of: a propylene homopolymer (HOMO); a propylene random copolymer (RACO) containing 5 wt % or less of at least one comonomer selected from C2 to C10 α-olefins (excluding C3 α-olefins); or a resin composition containing a HOMO or a RACO. When the comonomer content is excessively low, the fusion bonding properties with the first layer may be insufficient, and when the comonomer content is excessively high, the rigidity of the multilayer sheet may be reduced. From this viewpoint, the comonomer content is preferably more than 0 wt % and 4.5 wt % or less. The comonomer is preferably ethylene (C2 α-olefin). The MFR (230° C., load 2.16 kg) of the polymer or resin composition constituting the second layer is not limited, but is preferably 1 to 15 g/10 min, more preferably 2 to 10 g/10 min, and even more preferably 3 to 8 g/10 min.

The second layer may be formed of a resin composition containing a nucleating agent, or may be formed of a resin composition or polymer containing no nucleating agent. When the second layer contains a nucleating agent, the amount of the nucleating agent is preferably 1 part by weight or less, based on 100 parts by weight of the polymer that forms the second layer, from the economic viewpoint. Therefore, the second layer can be formed of a resin composition containing a HOMO and a nucleating agent, or a resin composition containing a RACO and a nucleating agent.

(7) Additive

The resin composition constituting the first layer and the second layer may further contain commonly used additives that are normally used for polyolefins, such as antioxidants, chlorine absorbers, heat-resistant stabilizers, light stabilizers, ultraviolet absorbers, internal lubricants, external lubricants, anti-blocking agents, anti-static agents, anti-fogging agents, flame retardants, dispersants, copper corrosion inhibitors, neutralizing agents, plasticizers, crosslinking agents, peroxides, extension oils, organic pigments, and inorganic pigments. The amount of the additive to be added may be a publicly known amount. Further, the resin composition may also contain synthetic resins or synthetic rubbers other than polypropylene, as long as the effect of the present invention is not impaired. One type of synthetic resin or synthetic rubber may be used, or two or more types thereof may be used.

(8) Precursor

As described later, the multilayer sheet of the present invention is preferably produced through a precursor in which a first biaxially oriented polypropylene layer having a melting point Tmh, and a second biaxially oriented polypropylene layer having a melting point Tml are laminated such that the first biaxially oriented polypropylene layers are not adjacent to each other. The layers of the precursor are fusion bonded to form the multilayer sheet of the present invention. Further, the precursor is formed into a desired shape and the layers thereof are fusion bonded at the same time, so that the precursor is directly formed into an article. Some of the layers constituting the precursor may be composed of the coextruded layer described above. Therefore, in the precursor, all of the interfaces are separated in one aspect, and one or more of the interfaces are fusion bonded and one or more of the interfaces are separated in another aspect. The fusion bonding between layers in another aspect is caused by coextrusion, and is not caused by thermocompression bonding described later.

2. Application

The multilayer sheet of the present invention has a high degree of orientation in the in-plane direction and a specific high-order structure as well as exhibits less dependency of the degree of orientation in the thickness direction. Thus, the multilayer sheet of the present invention has excellent mechanical properties while being lightweight. The multilayer sheet of the present invention also has excellent transparency. Therefore, the multilayer sheet of the present invention is useful as food packaging materials, containers, lids, or the like that are thinner and lighter than before. Further, the multilayer sheet of the present invention has high rigidity, and thus is useful as sundries, daily necessities, household electric appliance parts, toy parts, furniture parts, building parts, packaging components, industrial materials, distribution materials, agricultural materials, or the like. Moreover, the multilayer sheet of the present invention can also be used for automobile parts, electrical/electronic parts, outer case parts, or the like as a substitute for a steel plate.

In particular, the multilayer sheet of the present invention has excellent formability, and thus is useful as food packaging materials, containers, or the like. The container or the like is thin and lightweight, and has a wide operating temperature range.

3. Production Method

The multilayer sheet of the present invention is preferably produced by a method including: a step 1 of preparing a precursor in which a first biaxially oriented polypropylene layer having a melting point Tmh, and a second biaxially oriented polypropylene layer having a melting point Tml are laminated such that the first biaxially oriented polypropylene layers are not adjacent to each other; and a step 2 of bringing a heating element into contact with the outermost layer of the precursor to thermally fusion bond layers of the multilayer sheet. The melting points Tmh and Tml satisfy the relationship Tmh>Tml. The preferred difference in melting point is as described above. The difference in melting point improves adhesion between layers. Hereinafter, respective steps will be described.

(1) Step 1

In this step, a precursor is prepared in which the first biaxially oriented polypropylene layer and the second biaxially oriented polypropylene layer are laminated such that the first biaxially oriented polypropylene layers are not adjacent to each other. Some of the layers constituting the precursor may be composed of the coextruded layer described above. All of the interfaces of the precursor are not fusion bonded, or some of the interfaces are fusion bonded.

This step can be implemented by, for example, separately preparing the first biaxially oriented polypropylene sheet-like part (for convenience, hereinafter also referred to as "S1") and the second biaxially oriented polypropylene sheet-like part (for convenience, hereinafter also referred to as "S2"), and alternately laminating these parts. For example, a precursor can be prepared by laminating the parts so as to have a structure of S1/S2/S1/S2/S1. In this case, all of the interfaces are preferably not fusion bonded. Both outermost layers are preferably S1 from the viewpoint of enhancing the heat resistance of the resulting multilayer sheet.

A biaxially oriented polypropylene sheet-like part can be obtained by biaxially stretching polypropylene or a composition containing the polypropylene and additives by a publicly known method. For example, a biaxially oriented sheet-like part can be obtained by extruding or press molding the polypropylene or the like into a unoriented sheet (original sheet), and then biaxially stretching the unoriented sheet. The thickness of the original sheet is preferably more than 0.15 mm, and the upper limit thereof is not limited, but is preferably 6 mm or less from the viewpoint of ease of handling and the like. The temperature during biaxial stretching is not limited, but is preferably in a range of Tmh−10° C. to Tmh". The stretch ratio is preferably 4 to 6 times for one axis from the viewpoint of rigidity. The ratio for one axis and the ratio for the other axis may be the same or different. The two axes are preferably orthogonal.

This step is preferably performed using the coextruded sheet-like part composed of S1 and S2. Use of such a coextruded sheet-like part allows the step 2 to be simplified. Specifically, a coextruded biaxially oriented sheet-like part, in which S1 and S2 are alternately laminated, is prepared by coextruding a raw material of S1 and a raw material of S2 to prepare a coextruded original sheet having a plurality of layers, and biaxially stretching the coextruded original sheet. Subsequently, the coextruded biaxially oriented sheet-like parts, or the coextruded biaxially oriented sheet-like part and the above-described biaxially oriented sheet-like part are laminated to prepare a precursor. In this case, the total number of coextruded layers in the precursor is not limited, but is preferably 2 to 6. For example, a coextruded two-layer biaxially oriented sheet-like part having a structure of S1/S2, or a coextruded three-layer biaxially oriented sheet-like part having a structure of S2/S1/S2 is obtained, and a desired number of the sheet-like parts can be stacked. The thickness of the coextruded biaxially oriented sheet-like part is preferably 0.10 to 0.50 mm, and more preferably 0.15 to 0.50 mm.

As an example, when a coextruded two-layer biaxially oriented sheet-like part having a structure of S1/S2 is denoted as [S1/S2], the following precursor can be prepared, and then a five-layer multilayer sheet can be produced.

Precursor: [S1/S2]/[S1/S2]/S1
Multilayer sheet: S1/S2/S1/S2/S1

In the precursor, the interface between the coextruded biaxially oriented sheet-like part and another coextruded biaxially oriented sheet-like part, and the interface between the coextruded biaxially oriented sheet-like part and another single-layer biaxially oriented sheet-like part are not fusion bonded. The raw material of S1 is a material that can form S1, and may be any shape of a film, sheet, pellet, and powder. The same applies to the raw material of S2.

When the following precursor is prepared, the interface between the S2 layers at the center is fusion bonded to form a three-layer multilayer sheet having a structure of S1/S2/S1.

Precursor: [S1/S2]/[S2/S1]
Multilayer sheet: S1/S2/S1

Alternatively, the following precursor can be prepared by using a coextruded three-layer biaxially oriented sheet-like part, and then a five-layer multilayer sheet having a structure of S1/S2/S1/S2/S1 can be produced.

Precursor: [S1/S2]/[S2/S1/S2]/[S2/S1]
Multilayer sheet: S1/S2/S1/S2/S1

Each of the single-layer biaxially oriented sheet-like part and the coextruded biaxially oriented sheet-like part can be disposed in any direction. The orientation direction in-plane of the multilayer sheet can be adjusted depending on the disposition of the parts.

(2) Step 2

In this step, a heating element is brought into contact with the outermost layers of the precursor to thermally fusion bond between the respective layers. The melting point $Tm_{out}$ of the outermost layer and the temperature T of the heating element preferably satisfy the relationship $Tm_{out}-T \geq 4$(° C.). By satisfying the relationship, the layers can be favorably fusion bonded. The temperature difference is more preferably 6° C. or higher from this point of view. The upper limit of the temperature difference is not limited, but is preferably 40° C. or lower, and more preferably 30° C. or lower from the viewpoint of the production. T can be measured by any method, but is preferably measured by using a non-contact type thermometer such as a radiation thermometer. $Tm_{out}$ corresponds to the melting point of the sheet-like part disposed as the outermost layer. The melting point is defined as the peak temperature of the melting curve obtained through measurement by DSC under the condition of a heating rate of 10° C./min from 30° C. to 230° C.

The temperature of the heating element is not limited, but when the temperature is excessively low, fusion bonding failure may occur between layers. In addition, when the temperature is excessively high, the precursor is melted, so that the mechanical properties of the multilayer sheet may be deteriorated. From this viewpoint, the temperature of the heating element is preferably in a range of Tml to Tmh, and more preferably in a range of Tml+10° C. to Tmh. The specific temperature of the heating element is preferably approximately 120 to 190° C., more preferably 140 to 170° C., and even more preferably 150 to 165° C.

Preferably, this step is successively performed using a heating roll as the heating element. Specifically, the layers are fusion bonded by passing the precursor between two heated rolls. A heating roll including two or more pairs of rolls, each pair being composed of two rolls, is used as the heating element for fusion bonding. The pressure to be applied at that time is appropriately adjusted. The take-up speed in the roll forming is not limited, but is preferably approximately 0.05 to 10 m/min.

Examples of the method other than the roll forming include press-bond molding and seal molding. In addition, in the thermally fusion bonding the precursor, a pressure is preferably applied in order to suppress thermal shrinkage and further promote orientation. The pressure at that time is appropriately adjusted according to the fusion bonding temperature.

(3) Other Steps

The production method of the present invention may further include a publicly known step such as cooling the multilayer sheet obtained in the preceding step. Non-limiting examples of the cooling method include a method of cooling at room temperature or a method of cold-pressing at room temperature or at 10 to 20° C.

Since the multilayer sheet of the present invention has good adhesion between layers, there is almost no discontinuity between the layers. Thus, the multilayer sheet of the present invention can be dealt as an integrated sheet. In the conventional method, provision of a biaxially oriented multilayer sheet having a thickness of 0.20 mm or more has not been industrially realized in view of costs or the like. However, a multilayer sheet that has a thickness of 0.20 mm or more and has orientations of two or more directions can be industrially produced by the present invention.

By performing molding (including forming into a desired shape) on the multilayer sheet of the present invention, by the method according to the purpose, various formed articles can be obtained. Examples of the molding method include known press molding, hot plate molding, stretch molding, roll forming, drawing molding, press-bond molding, seal molding, vacuum forming, pressure forming, and vacuum-pressure forming. Further, a special film can be bonded to the outermost surface of the multilayer sheet of the present invention for the purpose of decoration, surface modification, or the like. Examples of the film to be bonded include anti-fogging films, low temperature sealing films, adhesive films, printed films, embossed films, and films for retort packaging. The thickness of the film of the outermost surface is not particularly limited, but an excessive thickness of the film may result in deterioration of the properties of the multilayer sheet. Further, special films generally require high cost and are not preferred in economical view. Thus, the film thickness is preferably thin. In the step 2, a special film may be laminated on the surface of the sheet-like part disposed as the outermost layer.

In addition, a coated sheet having a coating film on the sheet can also be obtained by applying coating to the multilayer sheet of the present invention. The type of coating film is not limited, and is not normally limited as long as the coating film is used in the coating field. However, in the present invention, coating films used for coating automobile bodies are preferred. Examples of the preferred coating film include epoxy-based coating films, urethane-based coating films, and polyester-based coating films. A lower layer coating film (primer coating film), a middle layer coating film, or an upper layer coating film (clear coating film) may be provided as necessary. In the case where the multilayer sheet of the present invention is used as a sheet to be coated (coating sheet), the surface to be coated preferably has a functional group.

(4) Application of Functional Group

The method for applying a functional group to the surface of the multilayer sheet of the present invention is not limited. For example, an oxygen-containing functional group can be applied to the surface by subjecting the sheet to plasma treatment or corona treatment. Alternatively, an oxygen-containing functional group can be applied to the surface of the multilayer sheet by preparing a polypropylene film having a functional group, and preparing the precursor in the step 1 so that the functional group-containing film is the outermost layer.

A polypropylene film having an oxygen-containing functional group can be obtained by forming a publicly known polypropylene such as maleic anhydride-modified polypropylene or epoxy-modified polypropylene into a film. The thickness of the functional group-containing film is not limited, but is preferably less than 150 μm. Moreover, the functional group-containing film may or may not be biaxially oriented. In the lamination step, a polypropylene film having a functional group and a polypropylene sheet having no functional group may be simultaneously laminated, or polypropylene sheets having no functional group are laminated to produce a multilayer sheet in advance, and then a polypropylene film having a functional group may be laminated on the surface of the sheet. However, the simultaneous lamination method is preferred in consideration of workability.

EXAMPLES

1. Preparation of Biaxially Oriented Sheet-Like Part

Respective biaxially oriented sheet-like parts shown in Table 1 were prepared as follows.

[Biaxially Oriented Sheet A]

A solid catalyst component (1) was prepared in accordance with the preparation method described in Examples of JP 2011-500907 A. Specifically, the preparation is as follows.

In a 500 mL four-neck round bottom flask purged with nitrogen, 250 mL of $TiCl_4$ was introduced at 0° C. Then, 10.0 g of fine spherical $MgCl_2 \cdot 1.8C_2H_5OH$ and 9.1 mmol of diethyl-2,3-(diisopropyl)succinate were added with stirring. $MgCl_2 \cdot 1.8C_2H_5OH$ was produced in accordance with the method described in Example 2 of U.S. Pat. No. 4,399,054 B, and the stirring operation was performed at 3,000 rpm instead of 10,000 rpm. The temperature was raised to 100° C. and maintained for 120 minutes. Next, the stirring was stopped, the solid product was allowed to precipitate, and the supernatant was sucked out. Then, the following operation was repeated twice: 250 mL of new $TiCl_4$ was added; the mixture was allowed to react at 120° C. for 60 minutes; and the supernatant was sucked out. The resulting solid was washed six times at 60° C. with anhydrous hexane (6×100 mL). Thus, a solid catalyst (1) was obtained.

The solid catalyst (1) obtained as described above, triethylaluminium (TEAL), and diisopropyldimethoxysilane (DIPMS) were brought into contact at 12° C. for 24 minutes in an amount such that the weight ratio of TEAL to the solid catalyst (1) was 11 and the weight ratio of TEAL to DIPMS was 3. The obtained catalyst system was maintained in a liquid propylene in the form of suspension at 20° C. for 5 minutes to carry out prepolymerization, and the resultant was used as a prepolymerization catalyst (S). The prepolymerization catalyst (S) was introduced into a polymerization reactor, and propylene as a monomer was supplied to the reactor. Further, a small amount of ethylene and hydrogen as a molecular weight modifier were supplied so that the ethylene concentration in the polymerization reactor was 0.095 mol % and the hydrogen concentration was 0.088 mol %. A propylene-ethylene copolymer (polymer a) was obtained by adjusting the polymerization temperature to 70° C., and the polymerization pressure to 3.0 MPa. To 100 parts by weight of the obtained polymer, 0.2 parts by weight of an antioxidant (B225, available from BASF), 0.05 parts by weight of a neutralizing agent (calcium stearate, available from Tannan Kagaku Kogyo Co. Ltd.) and a nonitol-based nucleating agent (Millad NX8000J, available from Milliken & Company) were blended, and the blend was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a resin composition (a) in the form of pellet. The ethylene-derived unit content of the polymer a was 0.4 wt %, and the MFR (temperature: 230° C., load: 2.16 kg) of the polymer a and the resin composition (a) was 4.5 g/10 min.

Using a three-type three-layer film/sheet forming machine (25 mm φ, available from TPIC Co., Ltd.), an original sheet having a thickness of 5.5 mm (size: 10 cm×10 cm or more) was obtained from the resin composition (a) at an extruding temperature of 230° C. Then, the original sheet was subjected to simultaneous biaxial stretching (5 times×5 times) at 160° C. using a film stretching apparatus (KARO-IV, available from Bruckner) to obtain a biaxially oriented sheet A having a thickness of 0.22 mm.

[Biaxially Oriented Sheet B]

A solid catalyst component (2) was prepared by the method described in Example 1 of EP 674991 B. The solid catalyst (hereinafter, sometimes abbreviated as "Pht") was a catalyst in which Ti and diisobutyl phthalate as an internal donner were supported on MgCl$_2$ by the method described in the above patent publication. The solid catalyst (2), TEAL, and DCPMS were brought into contact at −5° C. for 5 minutes in an amount such that the weight ratio of TEAL to the solid catalyst was 11 and the weight ratio of TEAL to DCPMS was 3. The obtained catalyst system was maintained in a liquid propylene in the form of suspension at 20° C. for 5 minutes to carry out prepolymerization. The obtained prepolymerization product was introduced into a polymerization reactor, and then hydrogen, propylene and ethylene were fed to the reactor. Then, a propylene-ethylene copolymer (polymer b) was obtained by setting the polymerization temperature to 75° C., the ethylene concentration to 1.07 mol %, the hydrogen concentration to 0.44 mol %, and adjusting the polymerization pressure. To 100 parts by weight of the obtained polymer b, 0.2 parts by weight of an antioxidant (B225, available from BASF) and 0.05 parts by weight of a neutralizing agent (calcium stearate, available from Tannan Kagaku Kogyo Co. Ltd.) were blended, and the blend was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a resin composition (b) in the form of pellet. The ethylene-derived unit content of the polymer b was 4.0 wt %, and the MFR (temperature: 230° C., load: 2.16 kg) of the polymer b and the resin composition (b) was 7.5 g/10 min.

Using a three-type three-layer film/sheet forming machine (25 mm φ, available from TPIC Co., Ltd.), an original sheet having a thickness of 5.5 mm (size: 10 cm×10 cm or more) was obtained from the resin composition (b) at an extruding temperature of 230° C. The original sheet was subjected to simultaneous biaxial stretching (5 times×5 times) at 140° C. using a film stretching apparatus (KARO-IV, available from Bruckner) to obtain a biaxially oriented sheet B having a thickness of 0.22 mm.

[Unoriented Sheet C]

The solid catalyst (2), TEAL, and cyclohexyl methyl dimethoxysilane (CHMMS) were brought into contact at −5° C. for 5 minutes in an amount such that the weight ratio of TEAL to the solid catalyst was 8 and the weight ratio of TEAL to CHMMS was 8. The obtained catalyst system was maintained in a liquid propylene in the form of suspension at 20° C. for 5 minutes to carry out prepolymerization, and the resultant was used as a prepolymerization catalyst.

The obtained prepolymerization catalyst was introduced into a polymerization reactor, propylene was then supplied as a monomer to the reactor. Further, hydrogen as a molecular weight modifier was supplied to the reactor so that the hydrogen concentration in the polymerization reactor was 0.041 mol %. A propylene homopolymer (polymer c) was obtained by setting the polymerization temperature to 75° C. and adjusting the polymerization pressure. To 100 parts by weight of the obtained polymer c, 0.2 parts by weight of B225 available from BASF, as an antioxidant, 0.05 parts by weight of calcium stearate available from Tannan Kagaku Kogyo Co. Ltd., as a neutralizing agent, and 0.05 parts by weight of a nonitol-based nucleating agent (Millad NX8000J, available from Milliken & Company) were blended, and the blend was mixed with stirring using a Henschel mixer for 1 minute. The mixture was melt-kneaded using an NVC extruder (available from Nakatani Machinery Ltd.) at a cylinder temperature of 230° C., and the extruded strand was cooled in water, followed by cutting with a pelletizer to obtain a resin composition (c) in the form of pellet. The ethylene-derived unit content of the polymer c was 0 wt %, and the MFR (temperature: 230° C., load: 2.16 kg) of the polymer c and the resin composition (c) was 3.0 g/10 min.

Using a three-type three-layer film/sheet forming machine (25 mm φ, available from TPIC Co., Ltd.), a unoriented sheet C having a thickness of 0.20 mm (size: 10 cm×10 cm or more) was obtained from the resin composition (c) at an extruding temperature of 230° C.

[Biaxially Oriented Sheet AB and Biaxially Oriented Film AB]

Using a three-type three-layer film/sheet forming machine (25 mm φ, available from TPIC Co., Ltd.), coextrusion was performed at an extruding temperature of 230° C. such that the resin composition (a) was extruded on the touch roll side and the resin composition (b) was extruded on the cast roll side, and thus, original sheets (thickness: 5.0 mm and 2.8 mm, size: 10 cm×10 cm or more) were obtained. The original sheets were each subjected to simultaneous biaxial stretching (5 times×5 times) at 165° C. using a film stretching apparatus (KARO-IV, available from Bruckner) to obtain a biaxially oriented sheet AB having a thickness of 0.20 mm and a coextruded biaxially oriented film AB having a thickness of 0.11 mm. The thickness ratio of the resin composition (a) to the resin composition (b) was 91/9.

[Biaxially Oriented Sheet BA and Biaxially Oriented Film BA]

Using a three-type three-layer film/sheet forming machine (25 mm φ, available from TPIC Co., Ltd.), coextrusion was performed at an extruding temperature of 230° C. such that the resin composition (b) was extruded on the touch roll side and the resin composition (a) was extruded on the cast roll side, and thus, original sheets (thickness: 5.0 mm and 2.8 mm, size: 10 cm×10 cm or more) were obtained. The original sheets were each subjected to simultaneous biaxial stretching (5 times×5 times) at 165° C. using a film stretching apparatus (KARO-IV, available from Bruckner) to obtain a biaxially oriented sheet BA having a thickness of 0.20 mm and a coextruded biaxially oriented film BA having a thickness of 0.11 mm. The thickness ratio of the resin composition (b) to the resin composition (a) was 9/91.

[Biaxially Oriented Sheet BAB]

Using a three-type three-layer film/sheet forming machine (25 mm φ, available from TPIC Co., Ltd.), coextrusion was performed at an extruding temperature of 230° C. so as to form a structure of resin composition (b)/resin composition (a)/resin composition (b), and thus, an original sheet having a thickness of 5.0 mm (size: 10 cm×10 cm or more) was obtained. The original sheet was subjected to simultaneous biaxial stretching (5 times×5 times) at 165° C. using a film stretching apparatus (KARO-IV, available from Bruckner) to obtain a coextruded biaxially oriented sheet BAB having a thickness of 0.20 mm. The thickness ratio was 8/84/8.

The physical properties of the resin composition and physical properties of the biaxially oriented sheet-like part are shown in Tables 1 and 2.

2. Production of Multilayer Sheet and Container

Example 1

The biaxially oriented sheet AB and the biaxially oriented sheet BA were laminated in this order to prepare a precursor in which both outermost layers were the biaxially oriented sheet A. The respective interlayers of the precursor were thermally fusion bonded using, as a heating element, a roll forming machine (induction heated jacket rolls, available from Tokuden Co., Ltd., model: JR-D0-W, roll diameter: 200 mmφ×2, length of roll surface: 410 mm), to produce a multilayer sheet as a laminate. The forming condition was as shown in Table 3.

The multilayer sheet was cut into a 250 mm square, and formed into a tray-shaped container using a small vacuum pressure forming machine (model: FVS-500) available from Wakisaka Engineering Co., Ltd. under the conditions of temperatures of upper and lower heaters of 360° C., a heating time of 36 seconds, and a compressed air pressure of 0.6 MPa. The shape of the container as a formed article was 130 mm in length, 100 mm in width, and 25.4 mm in depth. The length of the flat portion (bottom) was 90 mm, the width was 60 mm, and the thickness was 0.95 times the thickness of the multilayer sheet. At this time, the container was formed such that the length direction of the container was the MD of the sheet. The multilayer sheet and the container were evaluated as described below. For measurement of rigidity, cold impact resistance, and transparency of the container, a test piece obtained from the flat portion (bottom) was used.

Example 2

The biaxially oriented sheets AB, BAB, and BA were laminated in this order to prepare a precursor in which both outermost layers were the biaxially oriented sheet A. The multilayer sheet and the container were produced in the same manner as in Example 1, and then evaluated.

Example 3

The biaxially oriented sheets AB, BAB, BAB, and BA were laminated in this order to prepare a precursor in which both outermost layers were the biaxially oriented sheet A. The multilayer sheet and the container were produced in the same manner as in Example 1, and then evaluated.

Example 4

The biaxially oriented sheets AB, BAB, BAB, and BA were laminated in this order to prepare a precursor in which both outermost layers were the biaxially oriented sheet A. This precursor was cut into a 250 mm square, and formed into a tray-shaped container using a small vacuum pressure forming machine (model: FVS-500) available from Wakisaka Engineering Co., Ltd. under the conditions of temperatures of upper and lower heaters of 360° C., a heating time of 36 seconds, and a compressed air pressure of 0.6 MPa. The shape of the container was the same as the shape of the container produced in Example 1.

Example 5

A multilayer sheet and a container were produced in the same manner as in Example 1 except that the biaxially oriented film AB was used instead of the biaxially oriented sheet AB and the biaxially oriented film BA was used instead of the biaxially oriented sheet BA. Then, the sheet and the container were evaluated.

Comparative Example 1

A comparative sheet and container were produced using only the biaxially oriented sheet A in the same manner as in Example 1, and then evaluated.

Comparative Examples 2 and 3

Comparative sheets and containers were produced in the same manner as in Example 2 except that the heating roll temperature was changed, and then, the sheets and the containers were evaluated. In the multilayer sheet obtained in Comparative Example 2, the layers were not sufficiently fusion bonded. In Comparative Example 3, since respective layers were melted by using a stretching roll, a multilayer structure was not observed in the resulting sheet.

Comparative Example 4

A comparative sheet and container were produced in the same manner as in Example 2 except that the number of biaxially oriented sheets BAB was changed, and then, the sheet and the container were evaluated.

Reference Example 1

A comparative sheet and container were produced using the unoriented sheet C in the same manner as in Example 1, and then evaluated.

TABLE 1

| | Resin composition | | |
|---|---|---|---|
| | Resin composition (a) | Resin composition (b) | Resin composition (c) |
| Main layer/adhesive layer | For main layer | For adhesive layer | For Reference Example (unoriented sheet) |
| Polymer type | Polymer a RACO | Polymer b RACO | Polymer c HOMO |
| Catalyst species | Suc | Pht | Pht |
| Ethylene-derived unit content [wt %] | 0.4 | 4.0 | 0.0 |

TABLE 1-continued

| | Resin composition | | |
|---|---|---|---|
| | Resin composition (a) | Resin composition (b) | Resin composition (c) |
| MFR of polymer (230° C., 2.16 kg) [g/10 min] | 4.5 | 7.5 | 3.0 |
| Nucleating agent content [parts by weight] | 0.05 | — | 0.05 |

TABLE 2

| | Biaxially oriented sheet-like part, unoriented sheet-like part | | | | | |
|---|---|---|---|---|---|---|
| | A Single-layer extrusion (a) | B Single-layer extrusion (b) | AB Two-type two-layer coextrusion (a)/(b) | BA Two-type two-layer coextrusion (b)/(a) | BAB Two-type three-layer coextrusion (b)/(a)/(b) | C Single-layer extrusion (c) |
| Thickness of original sheet (mm) | 5.5 | 5.5 | 5.0 | 2.8 | 5.0 | 2.8 | 5.0 | 0.20 |
| Thickness ratio (layer 1/layer 2, layer 1/layer 2/layer 1) | — | — | 91/9 | 91/9 | 9/91 | 9/91 | 8/84/8 | — |
| Thickness of biaxially oriented sheet-like part [one sheet] (mm) | 0.22 | 0.22 | 0.20 | 0.11 | 0.20 | 0.11 | 0.20 | — |
| Biaxial stretching temperature (° C.) | 160 | 140 | 165 | 165 | 165 | 165 | 165 | — |
| Biaxial stretch ratio | 5 × 5 | 5 × 5 | 5 × 5 | 5 × 5 | 5 × 5 | 5 × 5 | 5 × 5 | — |
| Tmh (° C.) | 169 | 140 | 169 | 169 | 169 | 169 | 169 | — |
| Tml (° C.) | 169 | 140 | 140 | 140 | 140 | 140 | 140 | — |
| Tmh-Tml (° C.) | 0 | 0 | 29 | 29 | 29 | 29 | 29 | — |

TABLE 3-1

| | Example | | | | |
|---|---|---|---|---|---|
| | 1 | 2 | 3 | 4 | 5 |
| Structure | AB/BA | AB/BAB/BA | AB/BAB/BAB/BA | AB/BAB/BAB/BA | AB/BA |
| Total number of layers | 3 | 5 | 7 | 7 | 3 |
| Number of biaxially oriented sheet-like parts | 2 | 3 | 4 | 4 | 2 |
| Total thickness of precursor (mm) | 0.40 | 0.60 | 0.80 | 0.80 | 0.22 |
| Layer ratio (Dh/Dl) | 10 | 7.8 | 7.0 | 7.0 | 10 |
| Heating roll temperature T (° C.) | 155 | 155 | 155 | Preparation of multilayer sheet is omitted | 155 |
| Heating roll forming take-up speed (m/min) | 0.1 | 0.1 | 0.1 | | 0.1 |
| Tmh (° C.) | 169 | 169 | 169 | | 169 |
| Tml (° C.) | 140 | 140 | 140 | | 140 |
| Tmh − Tml (° C.) | 29 | 29 | 29 | | 29 |
| $Tm_{out}$ − T | 14 | 14 | 14 | | 14 |
| Scattering peak at $I_x^y$ | Yes | Yes | Yes | | — |
| Thickness of multilayer sheet (mm) | 0.40 | 0.60 | 0.80 | (0.80) | 0.22 |
| Rigidity of multilayer sheet | | | | | |
| Tensile modulus (MPa) | 3,000 | 2,800 | 2,400 | — | 3,000 |
| Cold impact resistance of multilayer sheet | | | | | |
| In-plane impact strength (−30° C.) (J) | 6.0 | 7.0 | 7.0 | — | 5.3 |
| Transparency of multilayer sheet | | | | | |
| Total haze (%) | 4.5 | 4.7 | 4.9 | — | 3.9 |
| Container forming temperature (° C.) | 165 | 165 | 165 | 165 | 165 |
| Thickness of container (mm) | 0.38 | 0.57 | 0.76 | 0.76 | 0.21 |

TABLE 3-1-continued

|  | Example | | | | |
|---|---|---|---|---|---|
|  | 1 | 2 | 3 | 4 | 5 |
| Rigidity of container | | | | | |
| Flexural modulus (MPa) | 3,160 | 2,950 | 2,500 | 1,850 | 3,160 |
| Cold impact resistance of container | | | | | |
| In-plane impact strength (−30° C.) (J) | 6.3 | 7.4 | 7.4 | 3.2 | 5.5 |
| Transparency of container | | | | | |
| Total haze (%) | 4.6 | 4.7 | 4.8 | 5.7 | 4.2 |
| Heat resistance of container | | | | | |
| Heat-resistant temperature in buckling test (° C.) | 128 | 133 | 151 | 110 | 112 |
| Presence or absence of delamination of container | No | No | No | No | No |

TABLE 3-2

|  | Comparative Example | | | | Reference Example Unoriented sheet |
|---|---|---|---|---|---|
|  | 1 | 2 | 3 | 4 | |
| Structure | A | AB/BAB/BA | AB/BAB/BA | AB/BAB/.../BAB/BA | C |
| Total number of layers | 1 | 5 | 5 | 15 | |
| Number of biaxially oriented sheet-like parts | 1 | 3 | 3 | 8 | 1[1)] |
| Total thickness of precursor (mm) | 0.22 | 0.60 | 0.60 | 1.60 | 0.20[2)] |
| Layer ratio (Dh/Dl) | — | 7.8 | 7.8 | 6.0 | — |
| Heating roll temperature T (° C.) | 155 | 135 | 175 | 155 | — |
| Heating roll forming take-up speed (m/min) | 0.1 | 0.1 | 0.1 | 0.1 | — |
| Tmh (° C.) | 169 | 169 | 169 | 169 | — |
| Tml (° C.) | 169 | 140 | 140 | 140 | — |
| Tmh − Tml (° C.) | 0 | 29 | 29 | 29 | — |
| $Tm_{out}$ − T | 14 | 34 | −6 | 14 | — |
| Scattering peak at $I_x^V$ | — | Yes | No | Yes | — |
| Thickness of multilayer sheet (mm) | 0.22 | 0.60 | 0.60 | 1.60 | 0.20[2)] |
| Rigidity of multilayer sheet | | | | | |
| Tensile modulus (MPa) | 3,100 | 2,800 | 2,400 | 1,800 | 1,300[2)] |
| Cold impact resistance of multilayer sheet | | | | | |
| In-plane impact strength (−30° C.) (J) | 2.8 | 0.5 | 0.8 | 10.0 | 0.1[2)] |
| Transparency of multilayer sheet | | | | | |
| Total haze (%) | 4.8 | 10 | 30 | 15 | 4.0[2)] |
| Container forming temperature (° C.) | 165 | 165 | 165 | 165 | 165 |
| Thickness of container (mm) | 0.21 | 0.57 | 0.57 | 1.52 | 0.19 |
| Rigidity of container | | | | | |
| Flexural modulus (MPa) | 3,300 | 2,950 | 2,530 | 1,900 | 1,370 |
| Cold impact resistance of container | | | | | |
| In-plane impact strength (−30° C.) (J) | 3.0 | 0.5 | 0.8 | 11 | 0.1 |
| Transparency of container | | | | | |
| Total haze (%) | 4.7 | 9.5 | 29 | 14 | 3.8 |
| Heat resistance of container | | | | | |
| Heat-resistant temperature in buckling test (° C.) | 114 | 110 | 95 | 160 | 90 |
| Presence or absence of delamination of container | No | Yes | No | Yes | No |

[1)]Number of unoriented sheets
[2)]Physical properties of unoriented sheet

3. Evaluation (1) MFR

With respect to the polymer, 0.05 g of H-BHT, available from Honshu Chemical Industry Co., Ltd. was added to 5 g of a sample, the mixture was homogenized by dry blending, and then the MFR was measured under the conditions of a temperature of 230° C. and a load of 2.16 kg according to JIS K7210-1. With respect to the resin composition, the MFR was measured under the conditions of a temperature of 230° C. and a load of 2.16 kg in accordance with JIS K7210-1.

(2) Ethylene-Derived Unit Content in Polymer (wt %)

A spectrum of $^{13}$C-NMR for the sample dissolved in a mixed solvent of 1,2,4-trichlorobenzene and deuterated benzene was obtained using AVANCE III HD400, available from Bruker ($^{13}$C resonance frequency: 100 MHz) under the conditions of measurement temperature: 120° C., flip angle: 45 degrees, pulse interval: 7 seconds, sample rotating speed: 20 Hz, and number of scans: 5,000 times. The ethylene-derived unit content (wt %) in the polymer was determined using the obtained spectrum by the method described in the literature of M. Kakugo, Y. Naito, K. Mizunuma and T. Miytake, Macromolecules, 15, p. 1150 to 1152 (1982).

(3) $Ix^V$ and $Ix^L$

As illustrated in FIG. 2, an X-ray (wavelength: 0.154 nm) was incident to the sheet in the X direction, using an X-ray scattering device (MicroMax and NanoViewer, available from Rigaku Corporation) to perform small angle X-ray scattering measurement. The background was removed for the obtained two-dimensional profile, and then the integrated intensity $Ix^L$ at an azimuth angle in the equatorial (Y axis) direction and the integrated intensity $Ix^V$ at an azimuth angle in the meridian (Z axis) direction were determined. The region of the integration ranged from the equator (Y axis) and the meridian (Z axis) to ±30° in the azimuth angle.

In this analysis, to reduce an influence of the reflection at the sheet surface, the size of the X-ray incident beam at the sample irradiation position needs to be kept from being much larger than the thickness of the sheet. At this time, measurement was performed with the beam size at the sample irradiation position set to 500 μm for a 0.40 to 1.60 mm-thick sheet.

(4) Melting Point Measured by DSC (Tmh and Tml)

Approximately 5 mg of a sample taken from a biaxially oriented sheet or a biaxially oriented film was weighed with an electronic balance. Thereafter, the sample was maintained at 30° C. for 5 minutes and then heated to 230° C. at a heating rate of 10° C./min by the differential scanning calorimeter (DSC) (Q-200, available from TA Instruments) to obtain a melting curve. For the peak temperature of the melting curve, the melting point of the first biaxially oriented polypropylene layer was defined as Tmh, and the melting point of the second biaxially oriented polypropylene layer was defined as Tml. In the case where a plurality of melting point peaks were observed in each of the layers, the temperature of the maximum peak was defined as the melting point. When the melting point of the outermost layer is defined as $Tm_{out}$, it follows that $Tm_{out}$=Tmh or $Tm_{out}$=Tml. However, as an aspect in which a high melting point component is contact with a heating element, $Tm_{out}$=Tmh is preferred.

(4) Rigidity (Tensile Modulus, Flexural Modulus)

The obtained sheet was formed into a type A2 multi-purpose test piece specified in JIS K7139 was prepared through machine processing. Tensile modulus was measured in accordance with JIS K7161-2, using a precision universal testing machine (Autograph AG-X 10 kN), available from Shimadzu Corporation, under the conditions of a temperature of 23° C., a relative humidity of 50%, and a test speed of 1 mm/min. A flat portion (bottom) of the container was cut to obtain a type B3 test piece (width 10 mm, length 80 mm) specified in JIS K7139. Using a precision universal testing machine (autograph AG-X 10 kN) available from Shimadzu Corporation, the flexural modulus was measured under the conditions of a temperature of 23° C., a relative humidity of 50%, a span of 64 mm, and a test speed of 2 mm/min.

(5) Cold Impact Resistance (In-Plane Impact Strength)

The puncture energy (J) for the obtained sheet was determined in accordance with JIS K7211-2 using Hydro-shot HITS-P10, available from Shimadzu Corporation. In a chamber adjusted to −30° C., a test piece for measurement was placed on a support base having a hole with an inner diameter of 40 mmφ and secured with a sample holder having an inner diameter of 76 mmφ. Then, the test piece was struck with a striker having a diameter of 12.7 mmφ and having a hemispherical striking surface at an impact velocity of 1 msec. The average value of the puncture energies of four test pieces for measurement was taken as the in-plane impact strength. In addition, a test piece having the same shape was prepared from the bottom of the container, and the in-plane impact strength of the container was evaluated under the same conditions.

(6) Transparency (Haze)

The haze was measured for the obtained sheet in accordance with ISO 14782 using HM-150, available from Murakami Color Research Laboratory Co., Ltd., and the transparency was evaluated as the total haze. Further, a test piece having the same shape was prepared from the bottom of the container, and the transparency of the container was evaluated under the same conditions.

(7) Delamination State of Container

The container was visually observed, and the presence or absence of delamination was evaluated.

(8) Heat Resistance of Container

A tray-shaped container was placed on an aluminum plate so that the opening was in contact with the aluminum plate. The container was held in an oven set at each temperature for 1 hour in a state in which no load is applied. After opening the oven door, a load (640 g) was immediately placed on the container. After 10 seconds, the load was removed, the aluminum plate and the container were taken out from the oven. Then, the presence or absence of buckling of the container was visually checked. The temperature at which the container started to buckle (the heat-resistant temperature in the buckling test) was measured to evaluate the heat resistance.

It is apparent that the multilayer sheet of the present invention has excellent transparency and mechanical properties and can be formed into an article having excellent transparency and mechanical properties.

REFERENCE SIGNS LIST

1 Polypropylene multilayer sheet
H First layer
L Second layer
S1 Polypropylene biaxially oriented sheet-like part as first layer
S2 Polypropylene biaxially oriented sheet-like part as second layer
C Coextruded layer
2 Incident X-ray
20 Beam size at sample irradiation position

The invention claimed is:

1. A polypropylene multilayer sheet comprising:
   a first biaxially oriented polypropylene layer having a melting point Tmh; and
   a second biaxially oriented polypropylene layer having a melting point Tml,
   the first biaxially oriented polypropylene layer and the second biaxially oriented polypropylene layer being alternately laminated,
   the polypropylene multilayer sheet having a thickness of 0.20 to 3.0 mm,
   the polypropylene multilayer sheet is produced by a process which comprises thermally fusion bonding interlayers of a precursor in which a first polypropylene biaxially oriented sheet-like part for the first biaxially oriented polypropylene layer and a second polypropylene biaxially oriented sheet-like part for the second biaxially oriented polypropylene layer are laminated, and
   the polypropylene multilayer sheet has a multilayer structure, wherein Tmh>Tml, and a total number of layers is 3 to 11, and wherein
   the precursor includes a coextruded layer in which the first biaxially oriented polypropylene layer and the second biaxially oriented polypropylene layer are coextruded as alternately laminated, and
   the coextruded layer has a thickness of 0.10 to 0.50 mm, and a total number of the coextruded layers is 2 to 6.

2. The polypropylene multilayer sheet according to claim 1, wherein a ratio Dh/Dl of a total thickness Dh of the first biaxially oriented polypropylene layer to a total thickness Dl of the second biaxially oriented polypropylene layer is 1 to 30.

3. The polypropylene multilayer sheet according to claim 1, wherein the first biaxially oriented polypropylene layer is formed of:
   a propylene homopolymer;
   a propylene random copolymer containing 1 wt % or less of at least one comonomer selected from C2 to C10 α-olefins, excluding C3 α-olefins; or
   a resin composition containing the propylene homopolymer or the propylene random copolymer.

4. The polypropylene multilayer sheet according to claim 1, wherein a polymer or a resin composition constituting the first biaxially oriented polypropylene layer has a melt flow rate (MFR) (230° C., load 2.16 kg) of 1 to 15 g/10 min.

5. The polypropylene multilayer sheet according to claim 1, wherein the second biaxially oriented polypropylene layer is formed of:
   a propylene homopolymer;
   a propylene random copolymer containing 5 wt % or less of at least one comonomer selected from C2 to C10 α-olefins, excluding C3 α-olefins; or
   a resin composition containing the propylene homopolymer or the propylene random copolymer.

6. The polypropylene multilayer sheet according to claim 1, wherein the first biaxially oriented polypropylene layer is formed of a resin composition containing a nucleating agent.

7. The polypropylene multilayer sheet according to claim 1, wherein in the multilayer polypropylene sheet, in an integrated intensity $Ix^V$ at an azimuth angle determined from a small angle X-ray scattering two-dimensional profile as measured by allowing an X-ray (wavelength: 0.154 nm) to be incident in the X direction, a scattering peak is observed in a range of $2\theta=0.2°$ to $1.0°$.

8. A method for producing the polypropylene multilayer sheet according to claim 1, the method comprising:
   a step 1 of preparing the precursor in which:
      the first biaxially oriented polypropylene layer having a melting point Tmh, and the second biaxially oriented polypropylene layer having a melting point Tml are laminated such that the first biaxially oriented polypropylene layers are not adjacent to each other,
   wherein
      the precursor includes the coextruded layer in which the first biaxially oriented polypropylene layer and the second biaxially oriented polypropylene layer are coextruded as alternately laminated, and
      the coextruded layer has a thickness of 0.10 to 0.50 mm, and a total number of the coextruded layers is 2 to 6; and
   a step 2 of bringing a heating element into contact with an outermost layer of the precursor to thermally fusion bond interlayers of the multilayer sheet, wherein Tmh >Tml,
   wherein a total number of layers in the polypropylene multilayer sheet is 3 to 11.

9. The production method according to claim 8, wherein a melting point $Tm_{out}$ of the outermost layer and a temperature T of the heating element satisfy the following condition:

$$Tm_{out} - T \geq 4(° C.)$$

where the melting point is measured by a differential scanning calorimeter (DSC) under condition of a heating rate of 10° C./min from 30° C. to 230° C.

10. The production method according to claim 8, wherein the step 1 includes a step of coextruding a raw material of the first biaxially oriented polypropylene layer and a raw material of the second biaxially oriented polypropylene layer to prepare a coextruded original sheet having a plurality of layers, and preparing the precursor using a product obtained by biaxially stretching the coextruded original sheet.

11. A formed article obtained by forming the polypropylene multilayer sheet according to claim 1.

12. The formed article according to claim 11, which is a container.

13. The precursor of the polypropylene multilayer sheet according to claim 1, wherein
   the first biaxially oriented polypropylene layer having a melting point Tmh, and
   the second biaxially oriented polypropylene layer having a melting point Tml are laminated such that the first biaxially oriented polypropylene layers are not adjacent to each other, and the precursor has one or more interfaces that are not fusion bonded and includes the coextruded layer in which the first biaxially oriented polypropylene layer and the second biaxially oriented polypropylene layer are coextruded as alternately laminated, and
   the coextruded layer has a thickness of 0.10 to 0.50 mm, and a total number of the coextruded layers is 2 to 6,
   wherein a total number of layers in the polypropylene multilayer sheet is 3 to 11.

* * * * *